March 15, 1955 W. D. REYNOLDS ET AL 2,703,996
CHATTERLESS DEBURRING TOOL
Filed Aug. 25, 1954
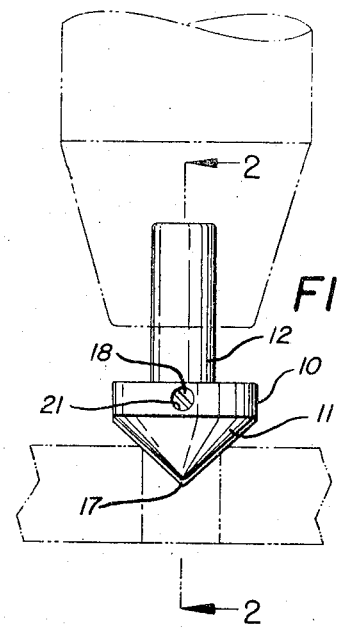
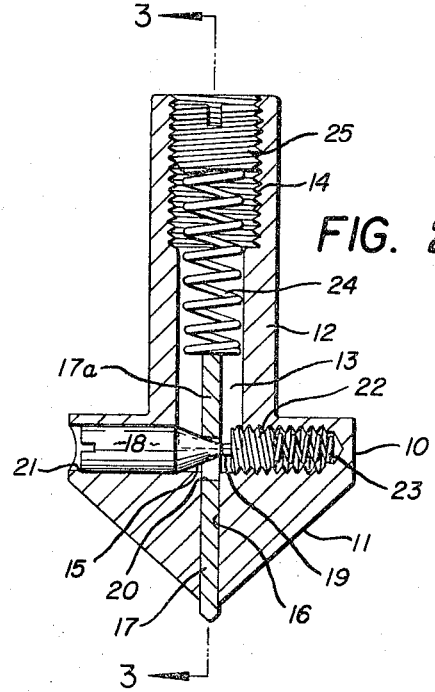
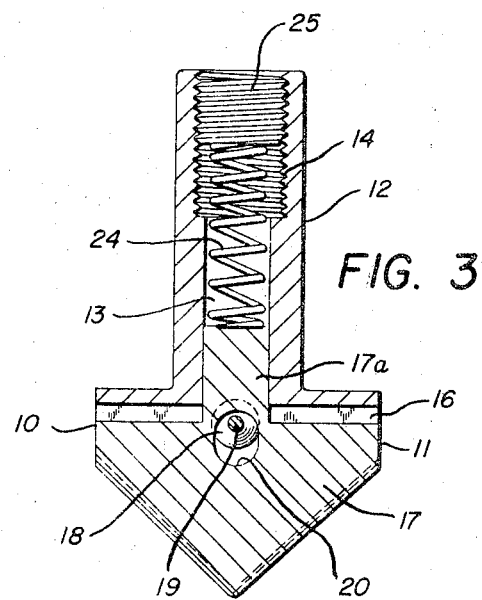
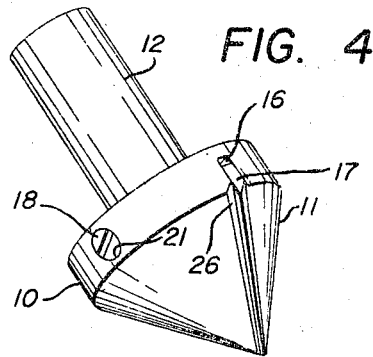
INVENTORS
WILLIAM D. REYNOLDS &
GUY S. RANDLES
BY
*W. B. Hartman*
ATTORNEY ![United States Patent Office]

2,703,996
Patented Mar. 15, 1955

2,703,996

CHATTERLESS DEBURRING TOOL

William D. Reynolds and Guy S. Randles, Alpena, Mich.

Application August 25, 1954, Serial No. 452,046

6 Claims. (Cl. 77—73.5)

This invention relates to a chatterless deburring tool for the removal of sharp edges or burrs from holes.

The principal object of the invention is the provision of a chatterless deburring tool having a bearing surface adjacent the cutting portion thereof rendering the cutter and tool chatterless in use.

A further object of the invention is the provision of a tool that may be used to chamfer or remove burrs from holes having keyways or the like.

A still further object of the invention is the provision of a chatterless deburring tool which is adaptable to any machine which can rotate the same.

A still further object of the invention is the provision of a deburring tool having a cutter mounted therein in an adjustable manner to permit controlled depth of cut or thickness of chip.

The deburring tool disclosed herein represents an improvement in the art relating to such tools by providing a tool capable of chamfering an angle about an opening with a smooth chatterless finish.

Those skilled in the art will recognize that it has heretofore been impossible to chamfer or deburr the area about an opening, when the opening is of non-circular contour, without the tool chattering and producing an uneven or irregular surface finish. The present tool overcomes these difficulties by providing a 360 degree conical bearing surface slotted transversely and mounting the cutter in the slot in an adjustable manner so that the depth of the cut can be controlled. By presenting the tool firmly to the workpiece, the continuous bearing surface of the tool adjacent the cutter enables the tool to rotate smoothly and to form a smooth chamfer as the tool operates completely free from chatter.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing wherein:

Figure 1 is a side elevation of the tool with dotted line representations of a chuck holding the same and a workpiece receiving the same.

Figure 2 is an enlarged vertical cross section taken on line 2—2 of Figure 1.

Figure 3 is a cross section taken on line 3—3 of Figure 2.

Figure 4 is a perspective view of the tool.

By referring to the drawings and Figures 1 and 4 in particular it will be seen that the chatterless deburring tool comprises an annular body 10 having a conical head 11 and an oppositely disposed cylindrical body extension 12. The body 10, conical head 11 and cylindrical body extension 12 are integral and the cylindrical body extension 12 defines a chamber 13, the outermost end of which is threaded as at 14 and which terminates at a point 15 adjacent the innermost end of a transversely extending slot 16.

An arrow-shaped cutter 17 is positioned in the transverse slot 16. The configuration of the arrow-shaped cutter 17 conforms with the conical head 11 and has a portion 17A registering in the chamber 13. The arrow-shaped cutter 17 is movable in the slot 16 and its protrudence beyond the conical head 11 is controlled by a cross screw 18 having an area 19 of reduced diameter inwardly of its ends and registering through an opening 20 in the cutter 17, as best shown in Figures 2 and 3 of the drawings.

The cross screw 18 is positioned transversely of the body 10 of the tool in a bore 21, the inner end of which is threaded as at 22 and the inner end of the cross screw 18 is threaded to engage the threaded section 22 and directly engages a tensioning spring 23 positioned in the inner end of the bore 21. The spring 23 serves to secure the cross screw 18 in adjusted position.

In operation the cutter 17 is forced outwardly of the slot 16 in the conical portion 11 of the tool by a coil spring 24 which is engaged against the inner end of the portion 17A of the cutter 17 and opposed by a threaded plug 25 engaged in the threaded end 14 of the chamber 13. By varying the position of the threaded plug 25, the degree of tension exerted by the cutter 17 on the workpiece may be varied for different materials or applications.

It will thus be seen that in operation, as shown in Figure 1 of the drawings, the tool is directly engaged against the workpiece and rotated with the coil spring 24 advancing the cutter 17 into the workpiece as the chamfering or deburring action is performed. The conical portion 11 of the tool is in continuous registry with the workpiece and thus all chattering is eliminated.

To disassemble the tool to replace the cutter when desired, the cutter 17 is moved inwardly of the slot 16 to permit the cross screw 18 to be removed from the bore 21. The edges of the conical portion 11 of the tool adjacent the leading sides of the slot 16 are cutaway as at 26 to provide channels for the chips being removed from the workpiece by the tool.

It will thus be seen that a simple and efficient chatterless deburring tool has been disclosed which meets the several objects of the invention.

Having thus described our invention, what we claim is:

1. A chatterless deburring tool comprising an annular body having a transversely slotted conical projecting head and an oppositely disposed hollow cylindrical extension, an arrow-shaped cutter movably disposed in said transverse slot, spring means in said hollow extension urging said cutter outwardly of said slot and means for retaining said cutter in said slot.

2. The chatterless deburring tool set forth in claim 1 wherein the means for urging the cutter outwardly of said slot comprises a coil spring and a movable plug.

3. The chatterless deburring tool set forth in claim 1 wherein the annular body has a transverse bore therein, and the cutter has an opening therein and said member retaining said cutter is positioned in said bore and engaged in said opening in said cutter.

4. A chatterless deburring tool comprising an annular body member having a transversely slotted conical head, a transversely extending bore in said annular body at right angles to said slot, a cylindrical extension on said annular body in oppositely disposed relation to said conical head, the outermost end of the inner wall of said cylindrical body being threaded, a threaded plug registering in said threaded inner wall for movement axially of said cylindrical extension, a coil spring in said cylindrical extension inwardly of said threaded plug, a cutter disposed in said transverse slot, the outer edges of said cutter conforming in shape with the outer surface of said conical head, the inner portion of said cutter conforming in shape with said cylindrical extension and engaging said coil spring, and a cross screw in said transverse bore loosely engaging said cutter.

5. The chatterless deburring tool set forth in claim 4 wherein the cutter has an opening intermediate its ends and the cross screw has an area of smaller diameter inwardly of its ends registering in said opening in said cutter.

6. The chatterless deburring tool set forth in claim 4 wherein the cutter has an opening intermediate its ends and the cross screw has an area of smaller diameter inwardly of its ends registering in said opening in said cutter, and a tension spring in said transverse bore engaged against the inner end of said cross screw.

References Cited in the file of this patent

UNITED STATES PATENTS

| | | |
|---|---|---|
| 2,613,558 | Swenson | Oct. 14, 1952 |
| 2,620,689 | Cogsdill | Dec. 9, 1952 |